United States Patent [19]

Thillaye du Boullay

[11] Patent Number: 4,484,534

[45] Date of Patent: Nov. 27, 1984

[54] DEVICE FOR LATERALLY SHIFTING A TOWED ASSEMBLY WITH RESPECT TO THE TRAJECTORY OF A TOWING VEHICLE

[75] Inventor: Benoît Thillaye du Boullay, Sevres, France

[73] Assignee: Institut Francais du Petrole, Rueil-Malmaison, France

[21] Appl. No.: 476,293

[22] Filed: Mar. 17, 1983

[30] Foreign Application Priority Data

Mar. 17, 1982 [FR] France ............................. 82 04667

[51] Int. Cl.³ .............................................. B63G 8/42
[52] U.S. Cl. .................................................. 114/244
[58] Field of Search ............... 114/242, 244, 245, 246; 244/153 R, 153 A, 154

[56] References Cited

U.S. PATENT DOCUMENTS

| | | | |
|---|---|---|---|
| 2,589,312 | 3/1952 | Wilcoxon | 114/245 |
| 2,960,960 | 11/1960 | Fehlner | 114/245 |
| 4,055,138 | 10/1977 | Klein | 114/244 |

Primary Examiner—S. D. Basinger
Assistant Examiner—Jesûs D. Sotelo
Attorney, Agent, or Firm—Millen & White

[57] ABSTRACT

Device for laterally shifting an assembly of apparatuses such as seismic streamer towed behind a ship, with respect to the ship route, comprising a profiled wing, connected to the assembly through a single cable, at the lateral end parts of which are formed two profiled caissons and whose central part therebetween is thinner and is provided in the middle with a profiled central rib extending from the leading edge to the trailing edge of the wing and protruding downwardly at said last edge beyond the height of the caissons.

6 Claims, 5 Drawing Figures

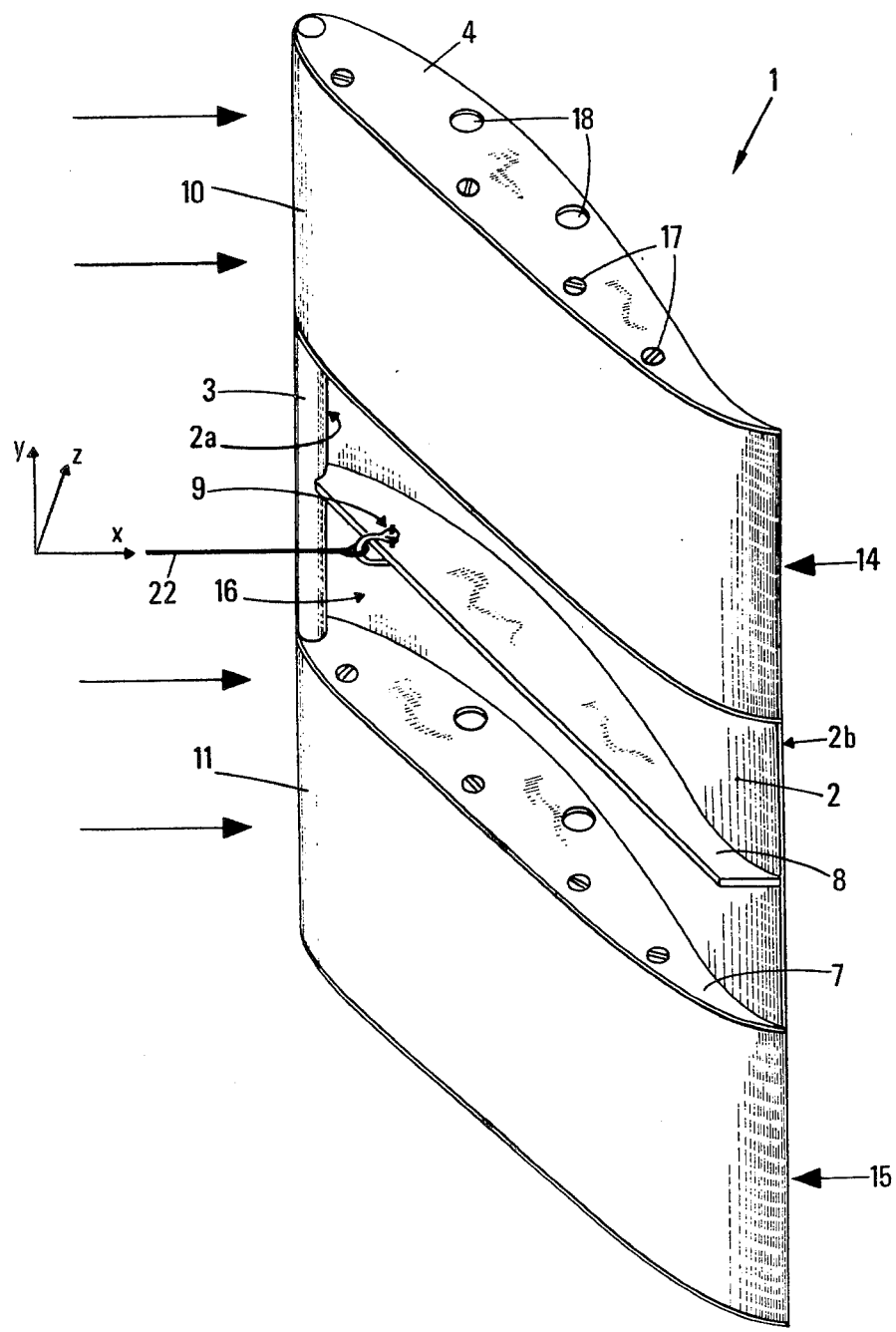

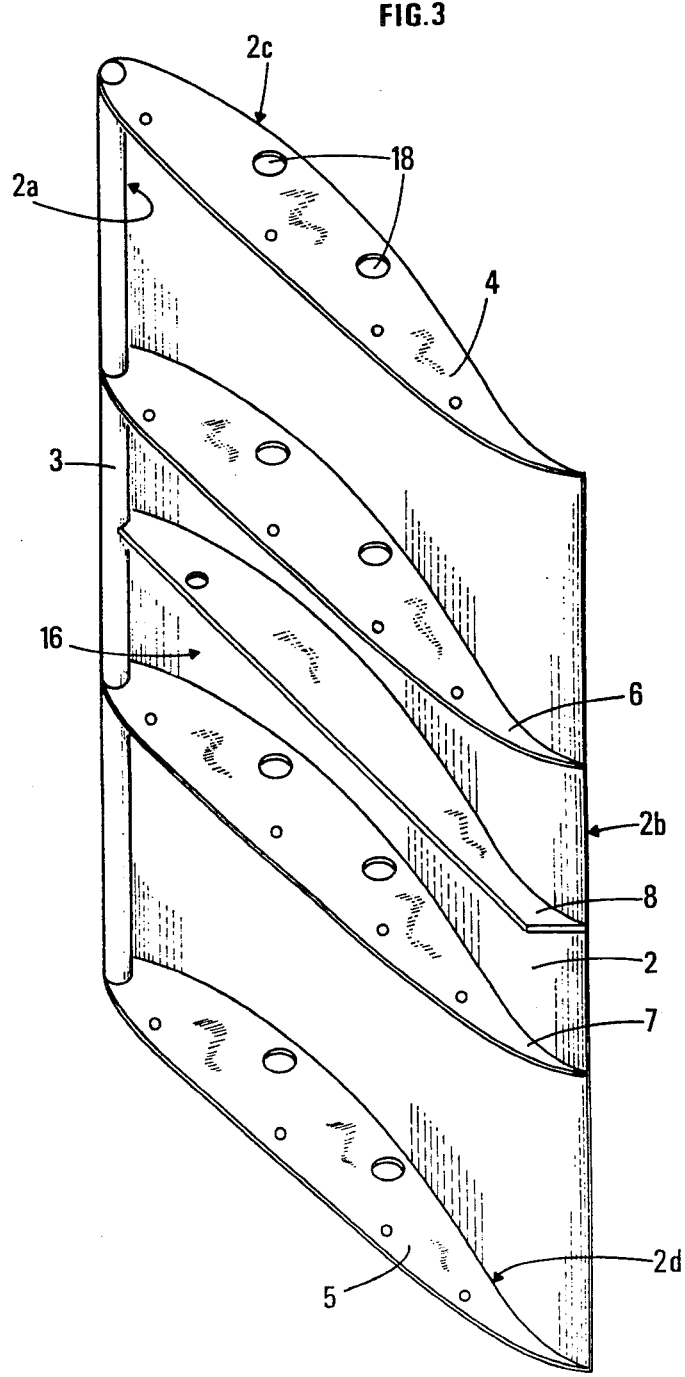

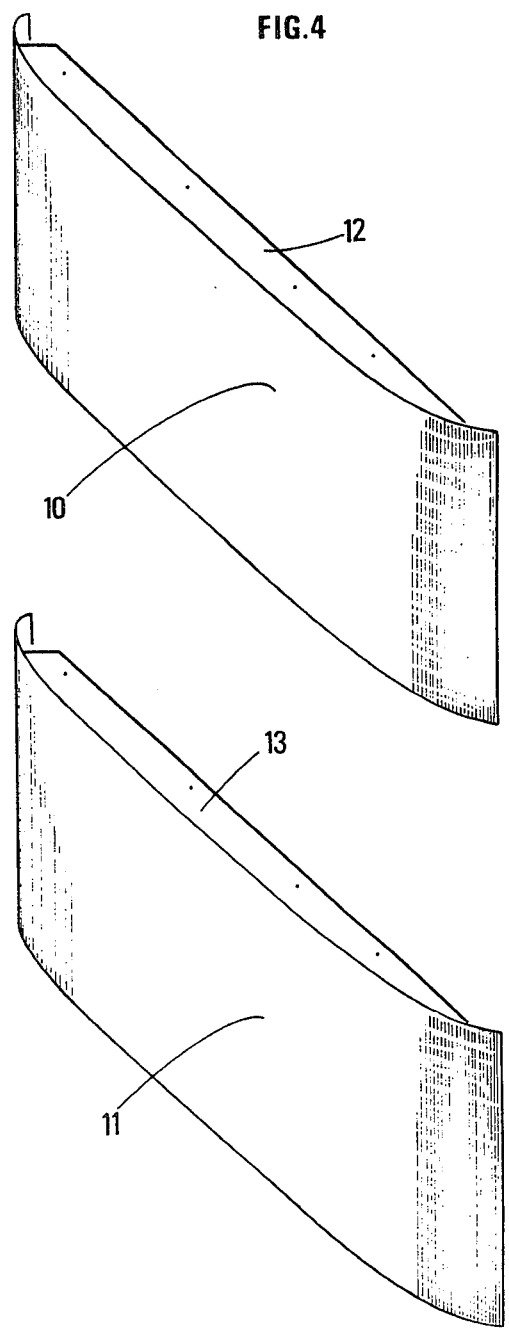

DEVICE FOR LATERALLY SHIFTING A TOWED ASSEMBLY WITH RESPECT TO THE TRAJECTORY OF A TOWING VEHICLE

BACKGROUND OF THE INVENTION

The invention relates to a device for laterally shifting a towed assembly with respect to the trajectory of a towing vehicle.

More particularly, the invention concerns a device associated to an assembly towed from a ship and adapted to laterally shift the assembly with respect to the ship route.

The device according to the invention may be used for example to laterally shift, with respect to a towing ship, an assembly of seismic equipments such as seismic sources or receivers.

In order to laterally shift an object with respect to the trajectory of a towing ship for example, there can be used for example a device such as that described in the French Pat. No. 2 296 562. This device comprises a frame secured to floats navigating at the surface. Under the floats are secured submerged deflection means formed of a plurality of paddles arranged parallelly to one another. The transported load is secured under the device through a cable and is towed under water. The disadvantages of this type of device result from its sensitivity to the disturbing action of the waves and from the speed variations of the towing ship having the effect of varying the position of the cable holding the load and accordingly of varying the immersion depth thereof, this being a disadvantage in certain applications in the field of marine seismic prospecting, for example.

The lateral shift of a submerged object may also be obtained by one or more plates or "panels" towed under water and secured to the end of a towing cable, so that the hydrodynamic forces have a transversed component which laterally shifts the same with respect to the ship route. These panels are formed in most cases of mere plates slightly rounded and provided on their concave face with strengthening ribs and several elements for securing the traction cables. These panels are mainly used to widen the opening of the fishing nets. The disadvantage of these devices results from their substantial drag which generates parasitic vibrations. When such panels are used for example to shift an assembly of submerged seismic sensors with respect to the trajectory of a towing ship, the parasitic vibrations generated by the displacement of these panels are superimposed on the seismic signals sensed by the receivers, in response to impulses generated by a seismic source also towed from the ship, and reflected by the different subsoil layers, and disturb the recording of these signals.

SUMMARY OF THE INVENTION

The device according to the invention makes it possible to simultaneously obtain a substantial shifting force and a low drag, so that it can be used in all the applications where the towed assembly is very sensitive to the noise generated by the displacement of the associated shifting device.

The device comprises a profiled wing connected to said towed assembly, whose leading edge is rounded and whose wall adapted to take its bearing, during operation, on the fluid (under-surface or intrados) and the opposite wall (extrados) have convex portions.

It is characterized in that a single cable connects it to the towed assembly and in that the walls of the wing define two caissons respectively located at its two opposite ends, these two caissons being separated by a central thinner portion having a concavity on the intrados side of the wing, said central portion being oriented perpendicularly to the leading edge, and a profiled central rib at the middle of the concave central portion and extending from the leading edge to the opposite edge (trailing edge), the central rib at the trailing edge being higher, at this same edge, than the wing thickness.

The wing comprises for example a first profiled plate provided with four ribs arranged symmetrically with respect to the central rib, these four ribs being tapered at the vicinity of the trailing edge, a second and a third plates whose span along a direction parallel to the leading edge of the wing is lower than one half of the span of the first plate, the second and the third plates being provided with lateral flanges co-operating with said four ribs and the first plate to laterally define the two caissons, the thinner central portion being defined by the edges of the two caissons facing each other and the wall of the first plate bearing on the fluid.

When the device must be disposed in water at a substantially vertical position, one or the other of the caissons is filled with a substance of specific gravity lower than that of the fluid.

The use of a profiled wing formed of two hollow caissons separated by a thinner concave central portion has simultaneously the effect of decreasing the drag and increasing the shifting force applied by the fluid. In addition, the symmetrical position of the caissons and the arrangement of the central rib co-operating with the ribs internally defining the two caissons, for orienting the water currents, contributes to give to the device a remarkable stability in water in spite of its connection to the towed assembly through a single cable.

BRIEF DESCRIPTION OF THE DRAWINGS

Other features and advantages of the device according to the invention will be made apparent from the description of a preferred embodiment, selected by way of a non-limitative example, and with reference to the accompanying drawings wherein:

FIG. 2 shows a perspective view of the device on the intrados side of the wing;

FIG. 3 shows a perspective view of the first profiled plate on the side opposite to the wing extrados;

FIG. 4 shows a perspective view of two other profiled plates to be applied against the first plate on the side opposite to the extrados.

Figure 1:
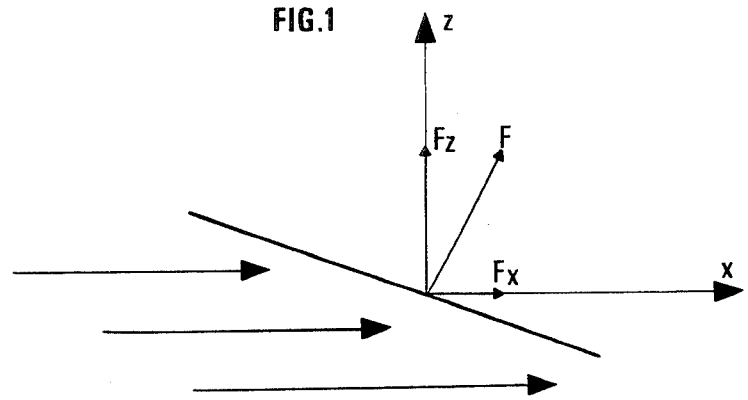
FIG. 1 diagrammatically shows a rigid plate and the different forces developed on said plate by a fluid in relative motion with respect thereto.

It is recalled that the total force exerted on a surface (FIG. 1) placed in a fluid in motion and having with respect thereto a relative velocity V, is expressed by:

$$F = \tfrac{1}{2}\rho C V^2 S$$

wherein $\rho$ is the specific gravity of the fluid, $S$ is the surface area and $C$ a coefficient depending on the characteristics of the surface.

This force is the resultant of two orthogonal forces, one, $F_x$, oriented parallelly to the direction of displacement being equal to:

$$\tfrac{1}{2}\rho C_x V^2 S$$

($C_x$ being the so-called drag coefficient), the other, $F_z$, oriented perpendicularly to the direction of displacement, being equal to:

$$\tfrac{1}{2}\rho C_z V^2 S$$

($C_z$ being the so-called lift or bearing coefficient).

With reference to FIGS. 2, 3 and 4, it can be seen that the device is essentially formed of a wing (1) comprising a first rigid profiled plate (2) obtained by shaping of a rectangular plate. A tube (3), of a length substantially equal to that of the plate (2) is secured along one of the sides 2a thereof. From said edge (2a) which forms the leading edge of the wing, and on the side thereof taking its bearing on the fluid (intrados), the plate (2) has a certain concavity, and then, at the vicinity of the opposite edge (2b) (trailing edge) it takes a reverse curvature. The first plate (2) is provided with four identical ribs (4, 5, 6, 7) of rounded shape at the vicinity of tube (3) and tapered at their opposite ends. Two of them (4, 5) are placed along the sides (2c, 2d) of the plate (2), perpendicularly to the leading edge (2a). The two other ribs (6, 7) are placed parallelly to the median plane of plate (2) and at a certain distance thereof. In the median plane, the plate (2) is also provided with a rib (8) whose height at the vicinity of the edge (2b) is greater than that of the other ribs. An anchoring clamp (9) for transmitting to the wing (1) the traction strains, is secured to the central rib (8).

The device also comprises (FIG. 4) a second plate (10) and a third plate (11) also obtained by shaping rectangular plates, which have a certain curvature along an axis parallel to their small sides. The large sides of the two plates (10, 11) are provided with flanges (12, 13) whose spacing is substantially equal to the distance from the ribs (4) and (6) on the one hand, (5) and (7) on the other hand, to the plate (2). The length of the two plates (10, 11) and their curvature are so adjusted that they bear against the tube (3) and the edge (2b) of the plate (2) by following the outline of the four profiled ribs (4, 5, 6, 7) and that they form with the latter and said first plate (2), two profiled caissons (14, 15). The central portion of the first plate defined by the ribs (6, 7) form the thin part (16) of the wing (1). Fastening means (17) are provided for securing the flanges (12, 13) of the plates (10, 11) when in position, to the profiled ribs (4, 6) and (5, 7) respectively. Orifices (18) of large diameter are provided in the four ribs (4, 5, 6, 7) to establish a free communication between the inside of caissons (14, 15) and the external medium.

When the device must be used in a vertical position in water, a material of specific gravity lower than that of the liquid is placed inside the caisson having to occupy the upper position, in such a manner as to make the device stable in the vertical position. The lower caisson may be weighted for increasing the stability of the device. The change in direction of the device is obtained by merely displacing from one caisson to the other the material used for the stabilization, or by interchanging the material and the weight, in the case of a weighted device.

The device is towed in such a manner that the two plates (10, 11) are oriented towards the bow. The intrados of the device is formed by the surfaces of the two plates (10 and 11) and the portion of the concave face of plate (2) between the two caissons (14, 15). The opposite face of plate 2 forms the extrados of the device.

Figure 5:
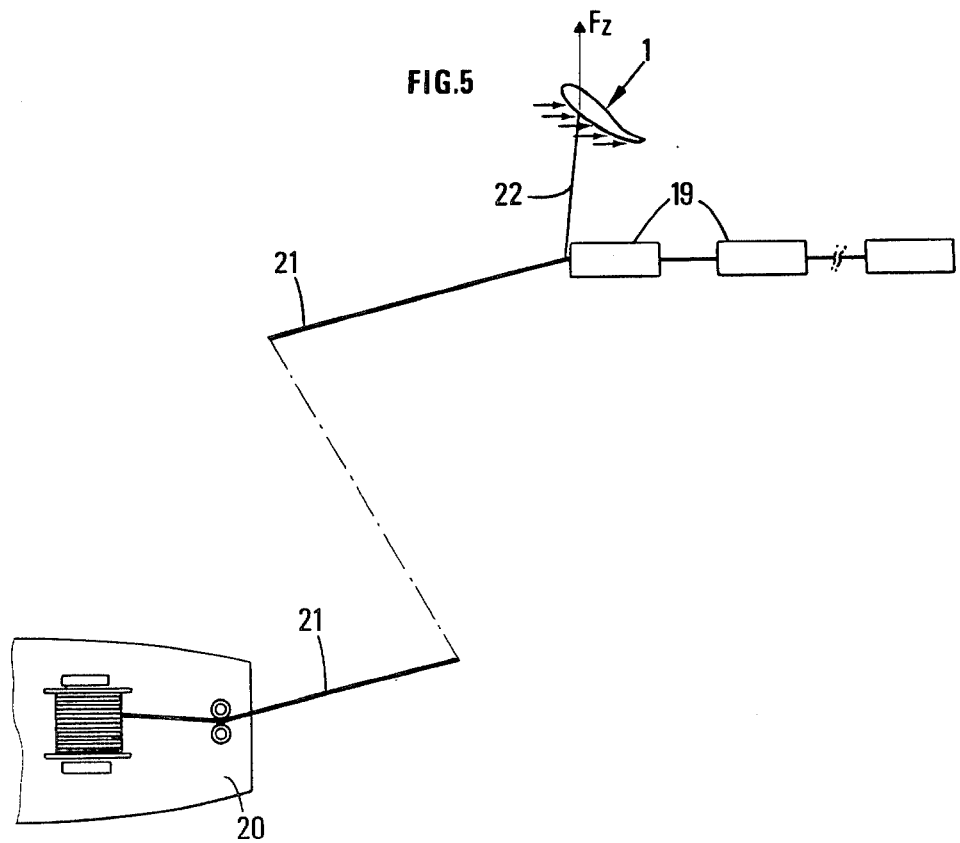
FIG. 5 diagrammatically shows an example of use of the device according to the invention.

The device according to the invention may be used for example (FIG. 5) for laterally shifting, with respect to the axis of a towing ship (20), an assembly of oceanographic apparatuses (19) or a plurality of such interconnected assemblies. These apparatuses may for example be hydrophones arranged inside a seismic streamer towed under water or may also be seismic shock sources such as that described in the French Pat. No. 1 583 737.

The apparatuses are interconnected and towed from the towing ship (20) through a traction cable or an assembly of multifunctional cables (21) comprising fluid and electric current feeding cables and traction cables. The first assembly of apparatuses is connected to the wing (1) through a traction cable (22). The carrying hydrodynamic force, oriented perpendicularly to the direction of displacement of the ship, which is expressed, as recalled, by the relationship:

$$F_z = \tfrac{1}{2}\rho C_z V^2 S.$$

has the effect of laterally shifting the assembly of apparatuses (19).

It has been observed, during experiments, that the described device, in view of its particular structure, has a very good stability in water and that its drag is lower than that of the conventionally used panels. It has also been observed that the thin central portion 16 between the two caissons (14, 15) of the wing results in an increase of its carrying capacity coefficient $C_z$ and, consequently, in an increase of the shifting force $F_z$ applied to the apparatus assemblies (19) towed under water. The thin concave profile being limited to the central portion of the wing, the increase of the induced drag which generally results from its use and which is associated to the formation, at the ends of the wing, of marginal swirls, is avoided.

The central rib (8), secured to the first plate (2), between the two caissons (14, 15), contributes to an increased stiffness thereof and makes it possible, by judiciously selecting the location of the anchoring flange (9), to fix the incidence angle of the wing with respect to water.

In addition, the central rib (8) acting as a stabilizer, tends to correct an eventual pivoting of the device axis OZ (cf. FIG. 1).

It would not be outside the scope of the invention to replace the second plate (10) and the third plate (11) by a single second plate of the same length as the first plate (2) and provided with a concave central portion, the central rib (8) being secured to said central portion.

What is claimed is:

1. A device for laterally shifting an assembly towed in a fluid through a towing cable by a vehicle, with respect to the trajectory thereof, comprising a profiled wing connected to said towed assembly, whose leading edge is rounded and whose forward side bearing on operation, on the fluid and the opposite rear side have convex portions, said device being connected to the towed assembly through a single cable and comprising two hollow caissons defined by the walls of the wing, said caissons being respectively located at the two opposite ends thereof, and being separated by a thinner central portion concave on the forward side of the wing, and said central portion being oriented perpendicularly to the leading edge, the device also comprising a profiled central rib, in the middle of said concave central portion, extending from the leading edge to the opposite edge, the height of the central rib at said opposite edge being greater, at said edge, than the thickness of the wing.

2. Device according to claim 1, wherein the wing comprises a first profiled plate provided with four ribs arranged symmetrically with respect to the central rib, said four ribs being tapered at the vicinity of said opposite edge, a second and a third plates whose span along a direction parallel to the leading edge of the wing is lower than one half the span of the first plate, the second and the third plates being provided with lateral flanges co-operating with said four ribs and the first plate to define laterally the two caissons, the thinner central portion being defined by the edges of the two caissons facing each other, and the wall of the first plate on the forward side.

3. A device according to claim 2, wherein one or the two caissons contains a substance of specific gravity lower than that of the fluid.

4. A device according to claim 2, wherein the first plate on the opposite rear side of the wing is convex over the larger part of its width and concave at the vicinity of said opposite edge and in that the second and the third plates have a uniform curvature.

5. A device according to claim 2, wherein said ribs are profiled and provided with openings for the free access of the fluid inside the two caissons.

6. A device according to claim 2, wherein the wing comprises a tube secured to the leading edge of the first plate, said four ribs and said central rib being secured to said tube and said first, second and third plates being so profiled as to bear on the tube and form a rounded edge.

* * * * *